United States Patent
Mifune et al.

(10) Patent No.: US 7,941,192 B2
(45) Date of Patent: May 10, 2011

(54) TORSION COIL SPRING AND SLIDING TYPE MOBILE TERMINAL EQUIPPED THEREWITH

(75) Inventors: Masayuki Mifune, Hiroshima (JP); Kimiaki Imai, Hiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 797 days.

(21) Appl. No.: 11/976,054

(22) Filed: Oct. 19, 2007

(65) Prior Publication Data

US 2008/0153558 A1    Jun. 26, 2008

(30) Foreign Application Priority Data

Dec. 21, 2006    (JP) ................................. 2006-344125
Dec. 21, 2006    (JP) ................................. 2006-344127

(51) Int. Cl.
*H04M 1/00* (2006.01)
(52) U.S. Cl. ................. 455/575.4; 455/575.1; 455/90.3; 455/425; 267/157
(58) Field of Classification Search .............. 455/575.4, 455/575.1, 575.8, 90.3, 325, 556.1, 550.1, 455/90.1, 425, 566; 369/282, 291, 253, 44.16, 369/75.5; 267/167, 157, 727, 179; 361/679.01, 361/683, 681, 361; 242/348, 348.2; 348/208.3
See application file for complete search history.

(56) References Cited

U.S. PATENT DOCUMENTS

| | | | | |
|---|---|---|---|---|
| 6,409,042 B1 * | 6/2002 | Hirano et al. | ................. | 220/812 |
| 7,319,892 B2 | 1/2008 | Kato et al. | | |
| 7,529,573 B2 * | 5/2009 | Kim | ........................... | 455/575.4 |
| 7,542,788 B2 * | 6/2009 | Lee | ............................. | 455/575.4 |
| 2002/0170998 A1 * | 11/2002 | Shima et al. | ................... | 242/348 |
| 2004/0190182 A1 * | 9/2004 | Kitamura et al. | .............. | 360/69 |
| 2004/0210192 A1 * | 10/2004 | Degentesh et al. | ........... | 604/151 |
| 2006/0180457 A1 * | 8/2006 | Han et al. | ....................... | 200/550 |
| 2006/0211460 A1 * | 9/2006 | Jeong et al. | ................. | 455/575.4 |
| 2007/0091555 A1 * | 4/2007 | Lee | ................. | 361/683 |
| 2008/0039157 A1 * | 2/2008 | Park | ........................... | 455/575.1 |
| 2008/0089036 A1 * | 4/2008 | Seo | ................. | 361/727 |
| 2008/0099969 A1 * | 5/2008 | Kim et al. | ...................... | 267/167 |
| 2008/0307607 A1 * | 12/2008 | Kim et al. | ....................... | 16/330 |
| 2009/0029748 A1 * | 1/2009 | Lee | ............................. | 455/575.4 |
| 2009/0029749 A1 * | 1/2009 | Lee | ............................. | 455/575.4 |

FOREIGN PATENT DOCUMENTS

DE    1779251 U    12/1958

(Continued)

*Primary Examiner* — Tan Trinh
(74) *Attorney, Agent, or Firm* — Birch, Stewart, Kolasch & Birch, LLP

(57) ABSTRACT

A torsion coil spring has first and second coil parts and first to third straight line parts. One end of the first coil part is continued to a first straight line part, while the other end is continued to one end of a second straight line part. The other end of the second straight line part is continued to one end of a second coil part, and the other end of the second coil part is continued to one end of the third straight line part. Also, a mobile terminal having a first housing slidably coupled to a second housing is provided. On the surface of the second housing, a pair of rail parts is provided extending in a sliding direction of the first housing. Between the rail parts, the torsion coil spring is provided for aiding sliding of the first housing on the rail parts of the second housing.

12 Claims, 15 Drawing Sheets

FOREIGN PATENT DOCUMENTS

| | | |
|---|---|---|
| EP | 1150476 A2 | 10/2001 |
| EP | 1530345 A1 | 5/2005 |
| JP | 48-84251 | 11/1973 |
| JP | 52-37140 | 9/1975 |
| JP | 52-155851 | 5/1976 |
| JP | 59-130303 A | 7/1984 |
| JP | 60-121217 U | 8/1985 |
| JP | 63-187742 U | 12/1988 |
| JP | 3-265726 A | 11/1991 |
| JP | 2003-111849 A | 4/2003 |
| JP | 2005-174919 A | 6/2005 |
| JP | 2005-210649 A | 8/2005 |
| JP | 2005-295024 A | 10/2005 |
| JP | 2006-063930 A | 3/2006 |
| JP | 2006-165854 A | 6/2006 |
| JP | 2006-206230 A | 8/2006 |
| JP | 2006-217594 A | 8/2006 |

* cited by examiner

FIG. 14A
FIG. 14B
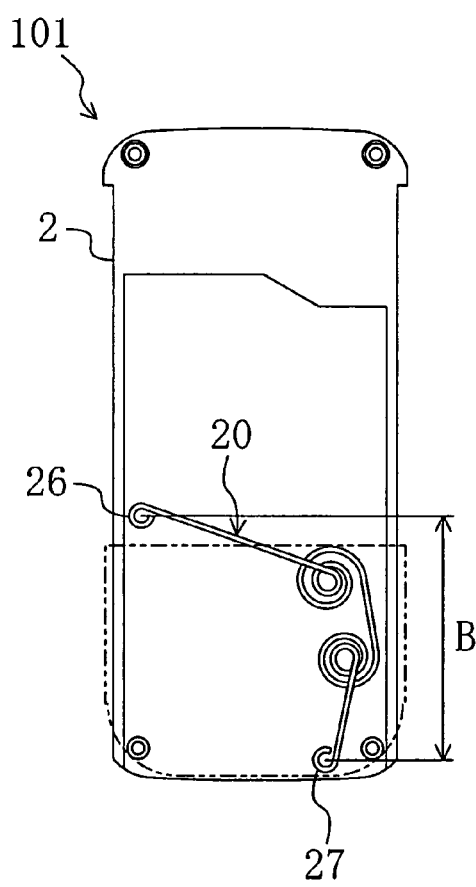
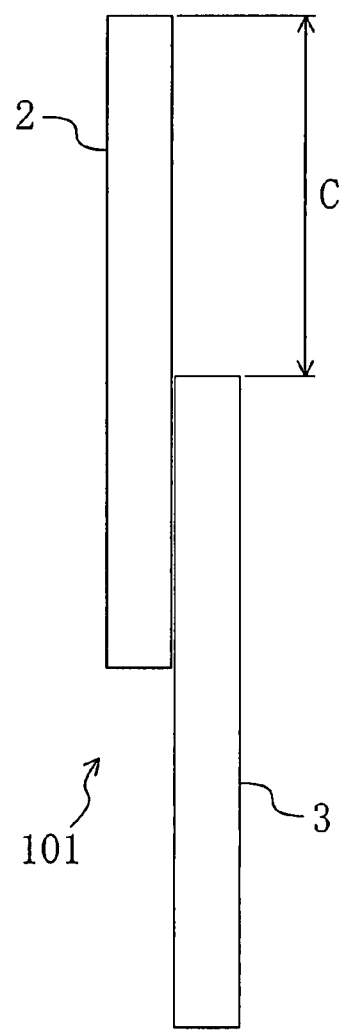

FIG. 15A
FIG. 15B
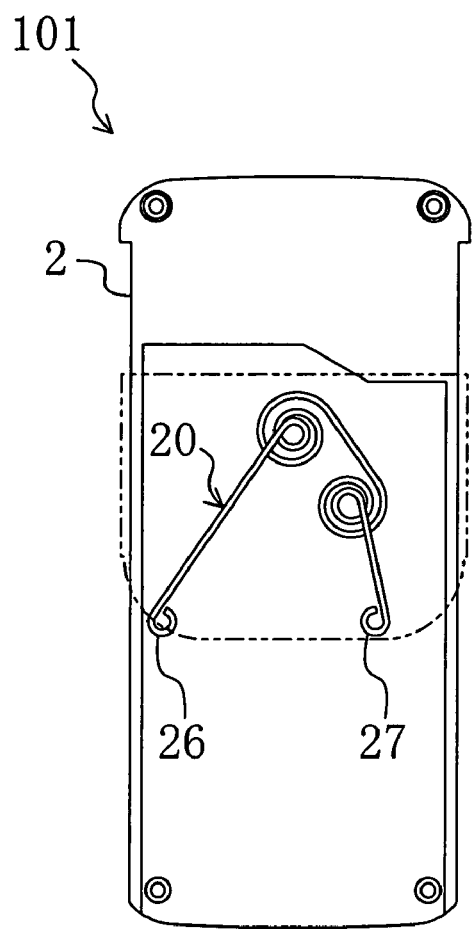
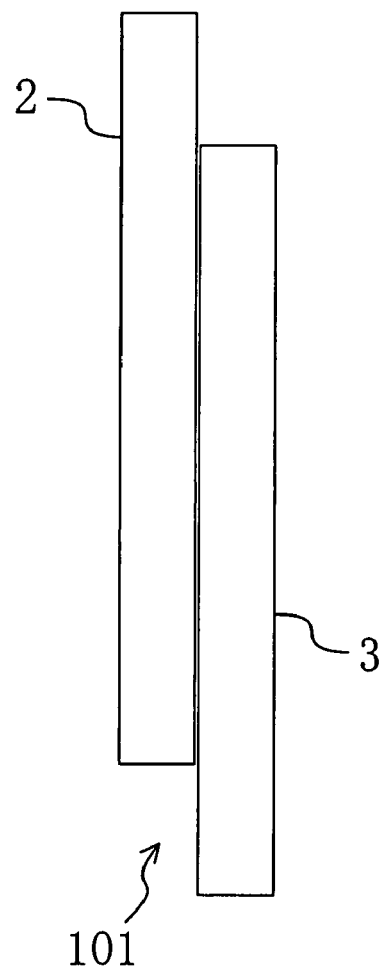

TORSION COIL SPRING AND SLIDING TYPE MOBILE TERMINAL EQUIPPED THEREWITH

This non-provisional application claims priority based on Patent Application Nos. 2006-344125 filed in Japan on Dec. 21, 2006, and 2006-344127 filed in Japan on Dec. 21, 2006, the entire contents of which are hereby incorporated by reference.

BACKGROUND OF THE INVENTION

1. Field of the Invention

The present invention relates to, for example, a torsion coil spring used for mobile phones, mobile communication terminal, and the like in which a first housing and a second housing are slidably connected to one another, and to a sliding type mobile terminal equipped with the torsion coil spring.

2. Description of the Related Art

A torsion coil spring having stretching force in the torsional direction has hitherto been used.

For example, in Japanese Unexamined Patent Application Publication No. 2005-174919, a torsion coil spring is used for electronic equipment having a battery pack or a housing part of dry cells. In this electronic equipment, the housing part has a lid for opening and closing an opening of the housing part. The lid is slidably attached to a plate-shaped member. The plate-shaped member is hinge-jointed to a member on a body side fixed to the equipment body, while at the same time constantly biased by an elastic member to a direction of opening the opening. The lid is rendered capable of rotary motion at a position, to which sliding movement is made from a position of closing the opening. The lid further is turned into an open state, where the lid is turned by approximately 90 degrees by the elastic member. While the lid is in the open state, the lid is arranged to abut on the equipment body so that the lid in an upright state.

In a biasing structure using a torsion coil spring disclosed in Japanese Unexamined Patent Application Publication No. 2006-206230, a cylindrical hole where a coil part of the torsion coil spring is housed is provided in an attachment portion to which the torsion coil spring and a member biased by this torsion coil spring are attached so that the coil part is externally supported by the inner wall face of the cylindrical hole. The attachment portion is provided with a hooker on which one end of the torsion coil spring is hooked. The other end of the torsion coil spring is hooked on the biased member.

Further, conventionally, there is a need to make a mobile terminal lightweight and small-sized to secure its portability, while, on the other hand, there is a demand to increase its display part for usability.

A straight type mobile terminal has a limited area that appears on the surface, and the display part and the operation part must be provided on the limited surface, making it impossible to secure sufficient space for the size of the display part. A folding type mobile terminal has the display part on the surface of the first housing and the operation part on the surface of the second housing, the first housing and the second housing being jointed at a hinge part. Consequently, the hinge part occupies much space on the display part, which serves as a hindrance to securing a place for the display part to occupy. Thus, it is occasionally impossible to maximize the size of the display part in the straight type mobile terminal and the folding type mobile terminal.

In view of this, in recent years, a sliding type mobile terminal, in which the display part can be increased, has been proposed. For example, as shown in Japanese Unexamined Patent Application Publication No. 2006-165854, there is known a sliding type mobile phone that includes the first housing having an operation part, the second housing having a display part, and slide engaging means of slidably engaging the first housing and the second housing. This sliding type mobile terminal has a slide resin member on the slide engaging means, and a protrusion is provided on a surface on the side facing the housing that faces the slide resin member, whereby when the both housings are slid in the direction of extension, at the end of the extension where the superposition of the both housings reaches a minimum, the slide resin member is in contact with the protrusion in a compressed state, thus reducing the sound of collision of the stopper at the opening and closing end when sliding for opening or closing.

However, the torsion coil springs disclosed in Japanese Unexamined Patent Application Publication Nos. 2005-174919 and 2006-206230 involve many times of winding to raise the height of the coil part, thereby disabling the springs to be provided in a thin space.

When the torsion coil spring is to be provided in a thin space, winding the coil part into a form of a mosquito-repellent incense, i.e., a series of rings of diminishing diameters on the same plane, is contemplated. In this case, there was such a problem that in order to obtain a necessary biasing power, the outside diameter of the coil part increases and thus takes up much space for installation, making it difficult to provide the spring in an biasing structure of a compact mobile terminal such as a mobile phone.

Further, in a sliding type mobile terminal such as what is shown in Japanese Unexamined Patent Application Publication No. 2006-165854, unless wiring of a signal line (including a flexible substrate) to connect the first housing and the second housing is properly carried out, it may impede sliding operation. As a result, there were problems in which a smooth sliding operation was not possible or the degree of sliding was reduced to prevent the signal line from getting entwined, thus causing the operation part to become small.

SUMMARY OF THE INVENTION

The present invention has been made in view of these circumstances. It is a first object of the present invention to provide a torsion coil spring that can be arranged in a thin space and is space-saving at the same time, with reduced height and outside diameter for the coil part.

Further, it is a second object of the present invention to devise the structure of a signal line that electrically connects the first housing and the second housing to one another and a torsion coil spring that aids the sliding of the first housing in order to facilitate the wiring of the signal line and thus to prevent the signal line from hindering the sliding operation, thereby increasing the degree of sliding.

To accomplish the first object, in the present invention, the torsion coil spring is provided with two coil parts.

Specifically, a first aspect of the invention is based on a torsion coil spring having a stretching force in a torsional direction. The torsion coil spring includes: a first and a second coil parts, and a first, a second, and a third straight line parts. One end of the first coil part continues to one end of the first straight line part, while the other end continues to one end of the second straight line part. The other end of the second straight line part continues to one end of the second coil part. The other end of the second coil part continues to one end of the third straight line part.

According to the configuration, the first and the second coil parts are connected through the second straight line part. When a force is applied to the first and the third straight line parts, the angle of torsion changes and a stretching force is generated by the first and the second coil parts in the torsional direction. By providing two coil parts, the angle of torsion of the respective coil parts can be halved in comparison to the case of only one coil part. As a result, to produce the same angle of torsion, the size of the coil parts can be reduced relative to the case of one coil part.

In a second aspect of the invention, according to the first aspect of the invention, the first and the second coil parts are wound in mutually opposite directions with gradually diminishing radiuses from ends of the second straight line part.

According to the configuration, by winding the coil parts into a form of a mosquito-repellent incense, the height is lowered. Further, because the coil parts are wound in turns in mutually opposite directions, the two coil parts can be disposed in a region sandwiched between the first and the third straight lines, thereby making small the size of the entire torsion coil spring.

In a third aspect of the invention, according to the second aspect of the invention, maximum radius segments and minimum radius segments of the first and second coil parts are arranged on the same plane as the second straight line part. The minimum radius segment of the first coil part and the minimum radius segment of the second coil part protrude in the same direction away from the same plane and are continuous respectively to the first straight line part and the third straight line part.

According to the configuration, since the portions where the first and the second coil parts continue respective to the first and the third straight line parts protrude in the same direction from the first and the second coil parts, the overall height is kept low, thereby enabling these parts to be arranged in a small space.

In a fourth aspect of the invention, according to the first aspect of the invention, a first annular part is formed at a tip of the first straight line part, and a second annular part is formed at a tip of the third straight line part.

According to the configuration, by inserting the tips of the first and the third straight line parts into pins, the torsion coil spring properly rotates around the first and the second annular parts, thereby aiding sliding of the two members.

In a fifth aspect of the invention, according to the fourth aspect of the invention, the third straight line part curves toward the same plane in side view, the second annular part is arranged on the plane, and the first annular part and the second annular part are offset in side view.

According to the configuration, when arranging the torsion coil spring in a gap between two objects subjected to sliding movement, the first annular part is easily attached to the one object, while the second annular part is easily attached to the other.

In a sixth aspect of the invention, according to the first aspect of the invention, the torsion coil spring is constituted of a stainless steel wire for spring.

According to the configuration, use of the torsion coil spring excelling in corrosion resistance contributes to enhancing durability.

Further, to accomplish the second object, in this aspect of the invention, arrangement of the signal wire and the torsion coil spring which aids the sliding movement of the first housing is devised.

Specifically, a seventh aspect of the invention is based on a sliding type mobile terminal provided with the torsion coil spring according to the first aspect of the invention.

The sliding type mobile terminal includes: a first housing having a display part on a surface thereof; a second housing having an operation part on the surface thereof; a flexible substrate electrically connecting the first housing and the second housing; and a slide mechanism having: a pair of rails parts on the surface of the second housing, the pair of rails parts extending in a sliding direction of the first housing; and the torsion coil spring, the slide mechanism slidably coupling the first housing and the second housing to one another. The torsion coil spring is provided between the pair of rail parts and performs at least one of aiding sliding of the first housing to cause the operation part to appear and aiding, after the sliding, sliding of the first housing back to an original position. The flexible substrate is disposed in the vicinity of the torsion coil spring at a preset distance from the torsion coil spring.

According to the configuration, the first and the second coil parts are connected through the second straight line part. When a force is applied to the first and the third straight line parts, the angle of torsion changes and a stretching force is generated by the first and the second coil parts in the torsional direction. By providing two coil parts, the angle of torsion of the respective coil parts can be halved in comparison to the case of only one coil part. As a result, to produce the same angle of torsion, the size of the coil parts can be reduced relative to the case of one coil part.

When the first housing is moved along the rail parts provided on the second housing, the operation part of the second housing appears to enable operation. At this time, since the torsion coil spring aids the sliding movement of the first housing, the sliding operation is carried out smoothly. Further, because the flexible substrate electrically connecting the first housing and the second housing is disposed at a preset distance from the torsion coil spring and the size of the coil part is reduced, when the first housing is subjected to sliding movement, the flexible substrate can be easily adapted not to contact the torsion coil spring and the flexible substrate is prevented from impeding the sliding operation. Consequently, the degree of sliding of the first housing is increased.

In an eighth aspect of the invention, according to the seventh aspect of the invention, the flexible substrate is coupled between the first housing and the second housing so that a bend part forms a U shape in side view.

According to the configuration, in keeping with the sliding movement of the first housing, the flexible substrate having flexibility smoothly changes its shape while the bend part retains its U shape in side view, and hence, the flexible substrate is prevented from impeding the sliding operation. As a result, the degree of sliding of the first housing further increases.

In a ninth aspect of the invention, according to the seventh aspect of the invention, the angle of torsion of the torsion coil spring reaches a minimum in a mid-position of an overall slide position of the first housing.

According to the configuration, when the first housing displaced from the mid-position, the compressed torsion coil spring tries to return to the original position so that the sliding movement of the first housing is aided in either direction.

In a tenth aspect of the invention, according to the ninth aspect of the invention, a first degree of sliding from apposition where the first housing is superposed on the second housing to the mid-position is smaller than a second degree of sliding from the mid-position to an end-point of the sliding movement of the first housing.

According to the configuration, if the first housing is moved slightly more than the first degree of sliding from the superposed state of the first housing and the second housing, even without applying any force, the first housing makes sliding movement to enable the operation part to appear due to the biasing power of the torsion coil spring. Similarly, if the first housing whose operation part has fully appeared is moved slightly more than the second degree of sliding from the end-point of the sliding movement of the first housing, even without applying any force, the first housing makes sliding movement to the superposed state of the first housing and the second housing due to the biasing power of the torsion coil spring. At this time, since the first degree of sliding is less than the second degree of sliding, the degree of sliding when the first housing is subjected to sliding movement to use the operation part becomes less than the degree of sliding when the first housing is superposed on the second housing to the standby state. Consequently, it is especially easy to slidably move the first housing to use the operation part.

In an eleventh aspect of the invention, according to the seventh aspect of the invention, a first annular part is formed at a tip of a first straight line part, and a second annular part is formed at a tip of a third straight line part.

According to the configuration, because the torsion coil spring properly rotates by inserting the tips of the first and the third straight line parts into pins, when the first housing is subjected to sliding movement, the flexible substrate can be easily adapted not to contact the torsion coil spring and the flexible substrate is prevented from impeding the sliding operation. Consequently, the degree of sliding of the first housing increases further.

In a twelfth aspect of the invention, according to the eleventh aspect of the invention, the first annular part of the first straight line part is positioned rotatably in the vicinity of a side of the first housing, while the second annular part of the third straight line part is positioned rotatably in the vicinity of an opposite side of the second housing.

According to the configuration, when the first housing is in sliding movement, the torsion coil spring is between a pair of rails, and with the position of the second annular part of its third straight line part being in the fixed state, the first annular part moves and rotates while avoiding the flexible substrate. Consequently, the degree of sliding of the first housing further increases.

In a thirteenth aspect of the invention, according to the twelfth aspect of the invention, maximum radius segments and minimum radius segments of the first and second coil parts are arranged on the same plane as the second straight line part, the minimum radius segment of the first coil part and the minimum radius segment of the second coil part protruding in the same direction away from the same plane and being continuous respectively to the first straight line part and the third straight line part.

According to the configuration, since the portions where the first and the second coil parts continue respective to the first and the third straight line parts protrude in the same direction from the first and the second coil parts, the overall height is kept low, thereby enabling these parts to be arranged in a small space.

In a fourteenth aspect of the invention, according to the thirteenth aspect of the invention, the third straight line part curves toward the same plane in side view, the second annular part is arranged on the plane, and the first annular part and the second annular part are offset in side view.

According to the configuration, when arranging the torsion coil spring in a gap between the first housing and the second housing, the first annular part can be easily attached to the first housing and the second annular part can be easily attached to the second housing.

In a fifteenth aspect of the invention, according to the seventh aspect of the invention, the sliding type mobile terminal is a sliding type mobile phone.

According to the configuration, since the sliding operation of the first housing can be carried out smoothly while increasing the degree of sliding of the first housing to keep the display part and the operation part large, a mobile phone of good portability and operability can be obtained.

BRIEF DESCRIPTION OF THE DRAWINGS

FIG. 14 is a diagram showing a first housing of a sliding type mobile terminal according to a modified example of an embodiment of the present invention when the first housing is slid to an upper end: FIG. 14(*a*) is a plan view, and FIG. 14(*b*) is a side view.

FIG. 15 is a diagram equivalent to FIG. 14 in which the first housing at the mid-position of the sliding movement is shown.

DETAILED DESCRIPTION OF THE INVENTION

With reference to the drawings, the embodiments of the present invention will hereinafter be described.

Figure 11:
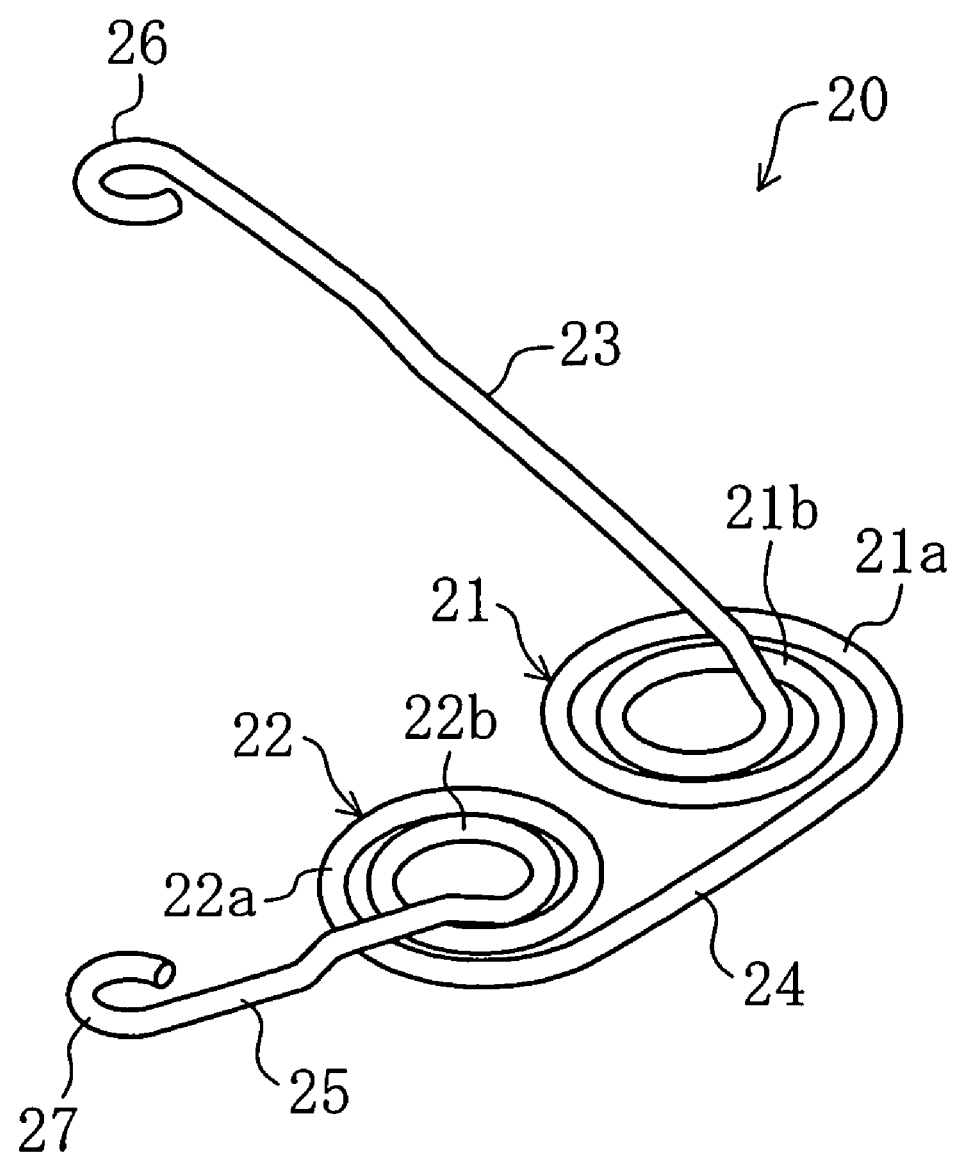
FIG. 11 is a perspective view of the torsion coil spring.
Figure 12:
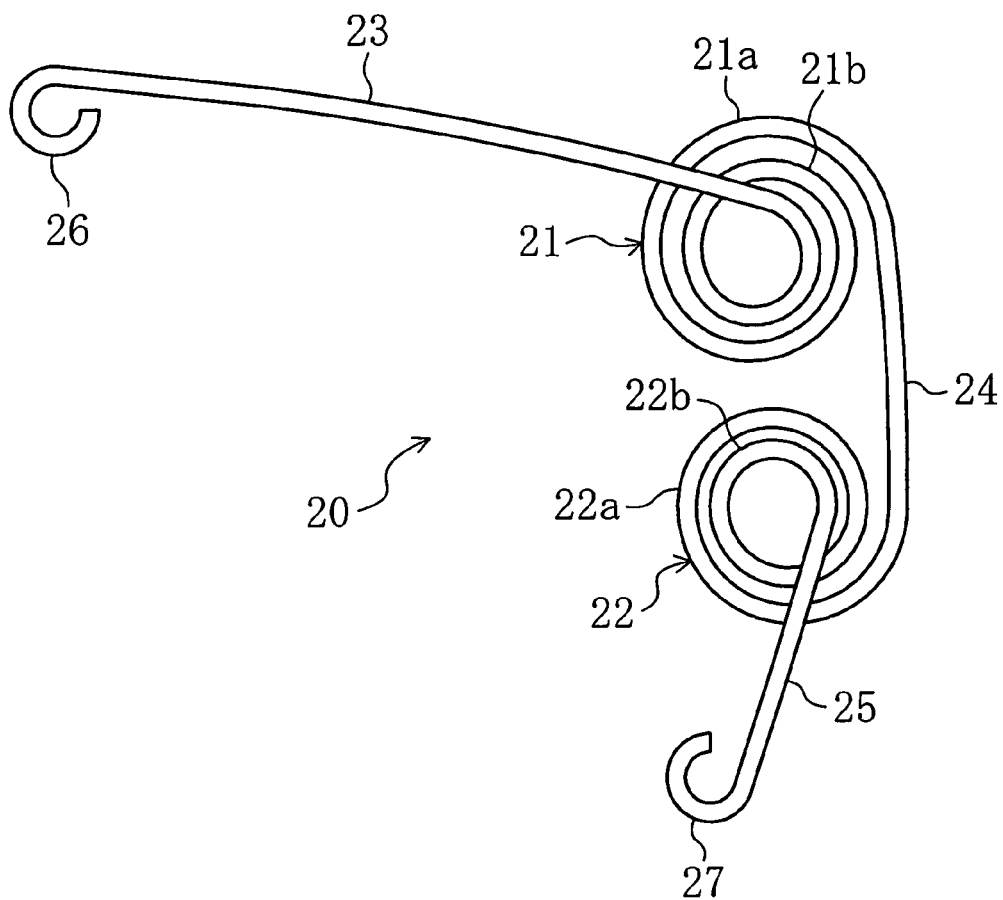
FIG. 12 is a plan view of the torsion coil spring.
Figure 13:
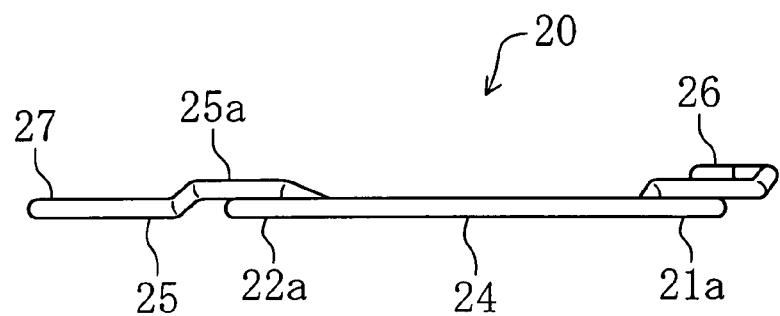
FIG. 13 is a side view of the torsion coil spring.

FIGS. 11-13 show a torsion coil spring 20 according to an embodiment of the present invention. This torsion coil spring 20 is constituted of a stainless steel wire for spring (e.g., SUS304WPA and SUS304WPB). Consequently, the torsion coil spring 20 excels in corrosion resistance with improved durability. The torsion coil spring 20 has a first and a second coil parts 21 and 22 and a first to a third straight line parts 23, 24, and 25. One end of the first coil part 21 continues to the first straight line part 23, while the other end thereof continues to one end of the second straight line part 24. The other end of the second straight line part 24 continues to one end of the second coil part 22, while the other end of the second coil part 22 continues to the third straight line 25. In the present embodiment, the first coil part 21 is longer than the third straight line 25 but may be as long as the third straight line 25.

The maximum radius segments 21*a* and 22*a* of the first and second coil parts 21 and 22, respectively, and the second straight line part 24 are arranged on the same plane. The maximum radius segments 21*a* and 22*a* and the minimum radius segments 21*b* and 22*b* of the first and second coil parts 21 and 22 are arranged on the same plane as the second straight line part 24, and the maximum radius segment 21a of the first coil part 21 and the maximum radius segment 22a of the second coil part 22 protrude in the same direction away from the same plane and are continuous respectively to the first straight line part 23 and the third straight line part 25. Since portions where the first and the second coil parts 21 and 22 continue to the first or the third straight line part 23 and 25 protrude in the same direction in this manner, the overall height is curtailed and these parts can be arranged even in a thin space.

The first and the second coil parts 21 and 22 are wound in mutually opposite directions with gradually diminishing radiuses from ends of the second straight line part 24. This enables the two coil parts 21 and 22 to be disposed in a region sandwiched between the first and the third straight lines 23 and 25, and therefore, the overall size of the torsion coil spring 20 becomes small.

A tip of the first straight line part 23 is folded to form a first annular part 26, and a tip of the third straight line part 25 is folded to form a second annular part 27.

Further, the third straight line part 25 curves toward the same plane in side view, the second annular part 27 is arranged on the plane, and the first annular part 26 and the second annular part 27 are offset in side view. As a result, the first annular part 26 can be attached easily to the first housing 2, while the second annular part 27 can be attached easily to the second housing 3.

The torsion coil spring 20 is such that when a force is applied to the first and the third straight line parts 23 and 25, the angle of torsion changes and a stretching force is generated by the first and the second coils 21 and 22 in the torsional direction. By providing the two coil parts 21 and 22, the angle of torsion of the respective coil parts can be halved in comparison to the case of only one coil part. As a result, to produce the same angle of torsion, the size of the coil parts can be reduced relative to the case of one coil part.

—Example of Usage—

Next, an example of usage of a torsion coil spring according to the present embodiment will be described in detail.

Figure 1:
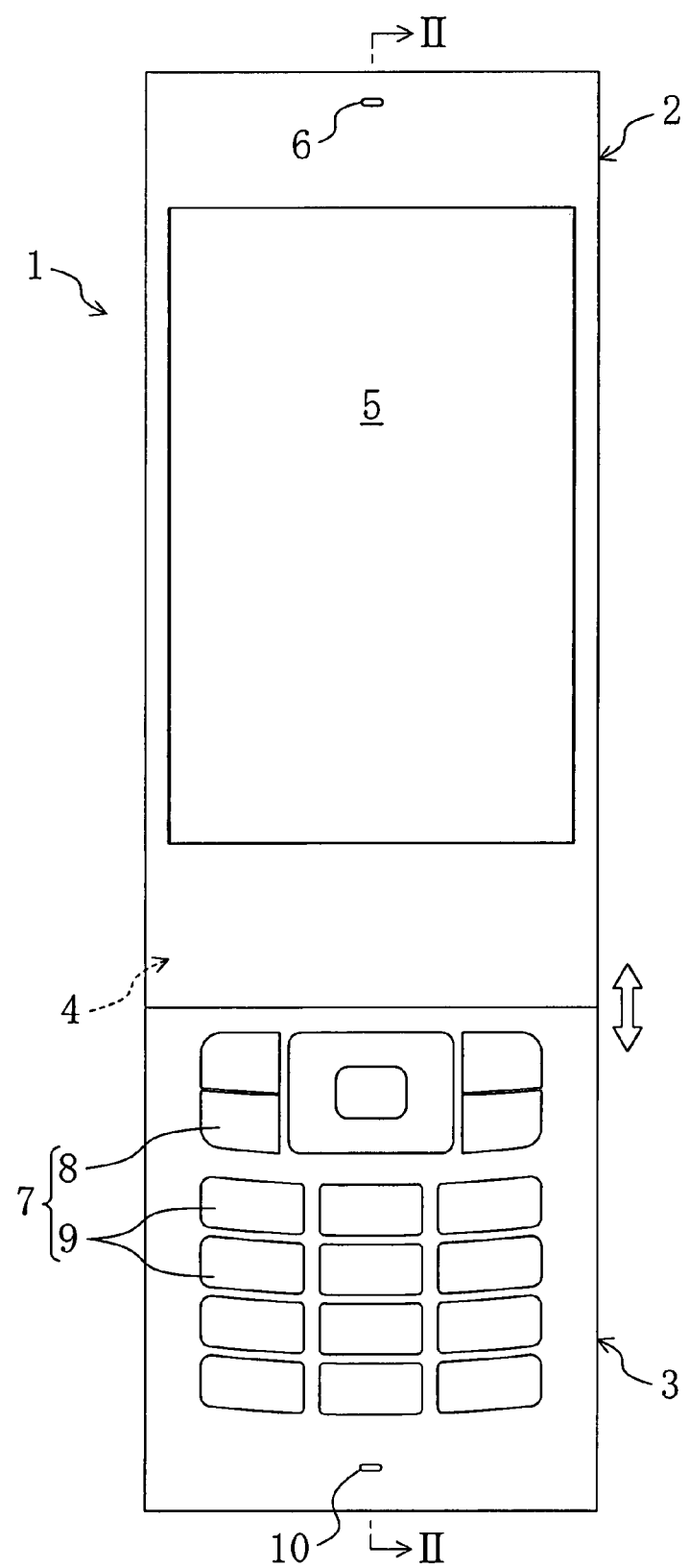
FIG. 1 is a front view showing a first housing of a sliding type mobile terminal for which a torsion coil spring according to an embodiment of the present invention is used when the first housing is slid to an upper end.
Figure 2:
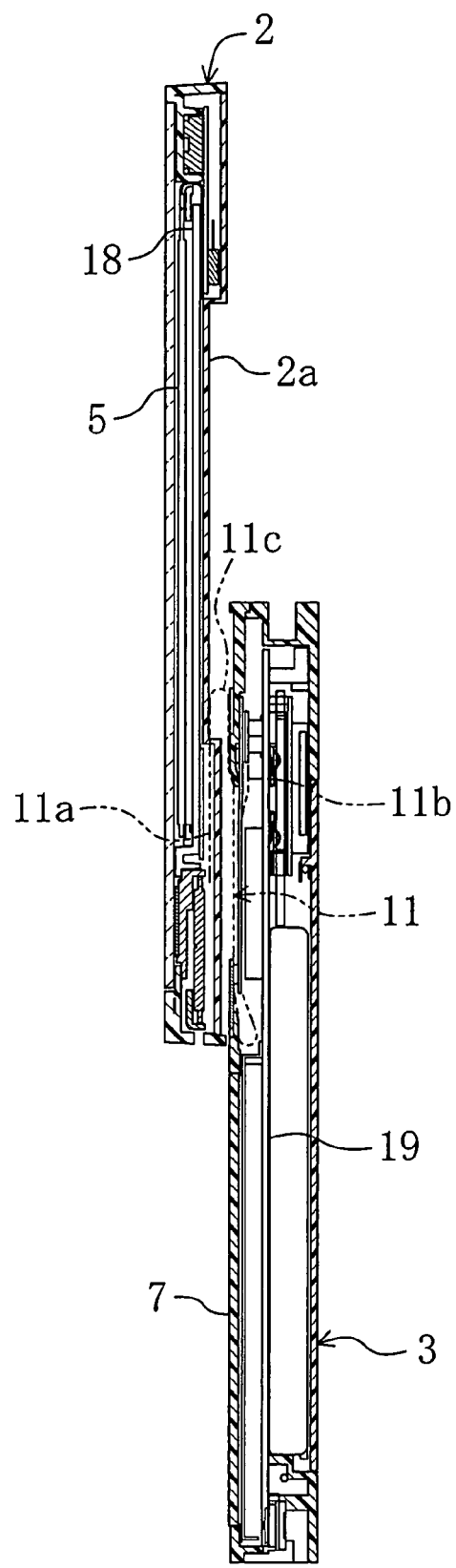
FIG. 2 is a sectional view of FIG. 1 along line II-II.
Figure 3:
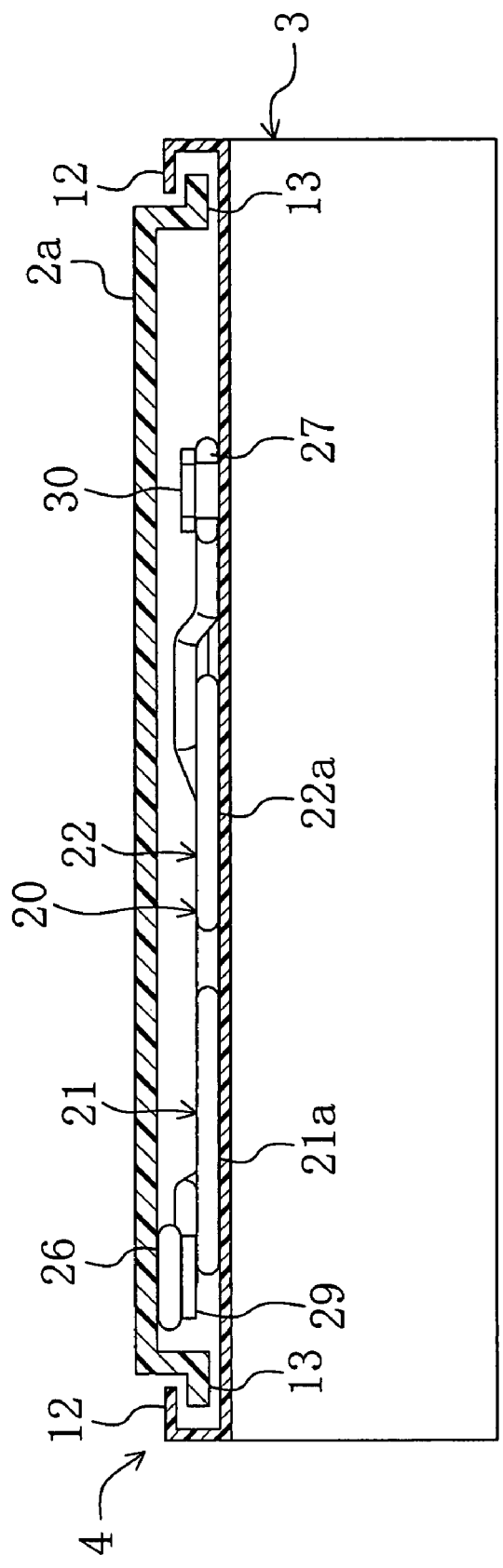
FIG. 3 is a sectional view of FIG. 5 along line III-III.
Figure 4:
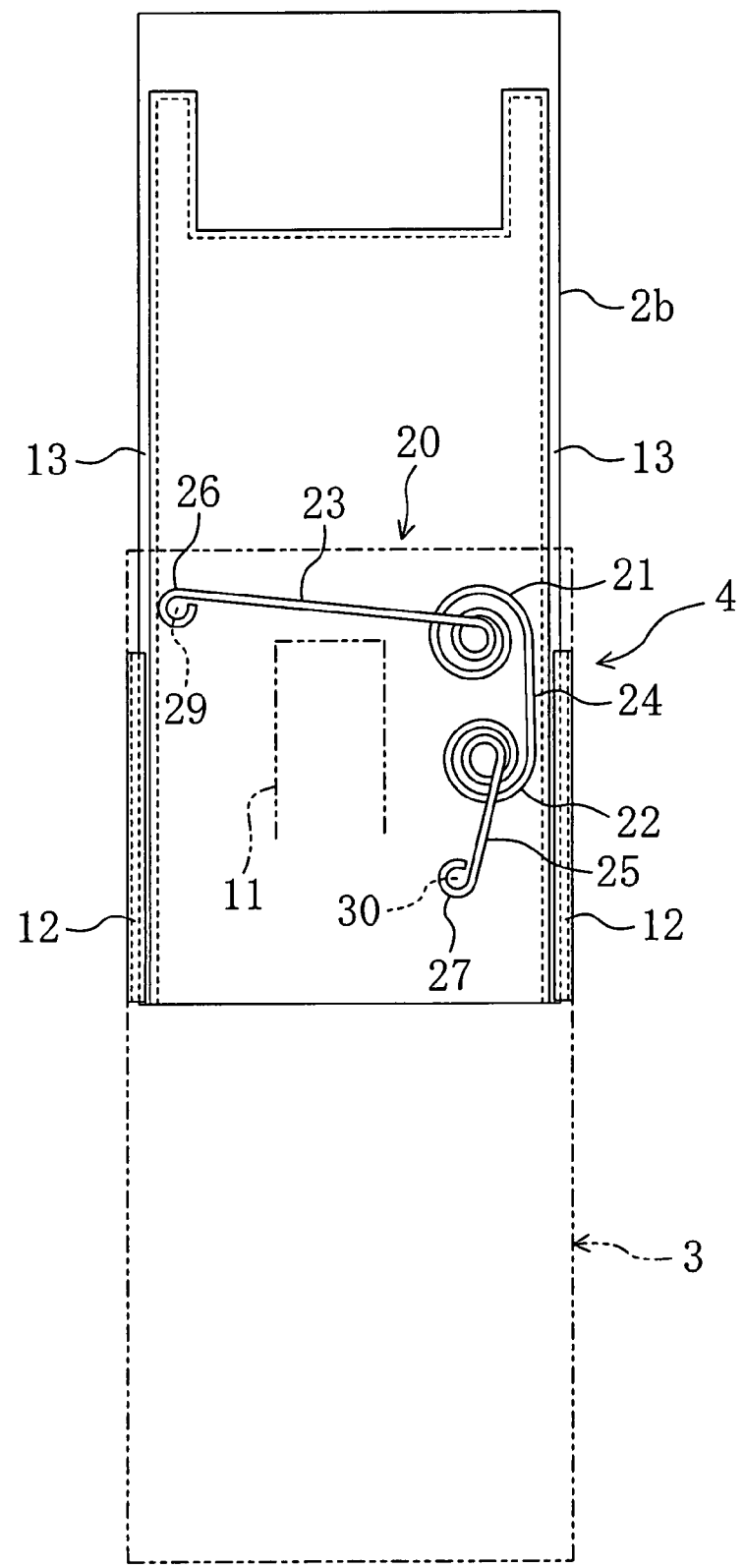
FIG. 4 is a diagram equivalent to FIG. 1 in which a torsion coil spring can be seen.

FIG. 1 is a front view of a first housing of a sliding type mobile phone which is provided with a torsion coil spring according to an embodiment of the present invention when the first housing is slid to an upper end. FIG. 2 is a sectional view of FIG. 1 along line II-II. FIG. 4 is a diagram equivalent to FIG. 1 in which the torsion coil spring can be seen. FIGS. 5-10 are diagrams equivalent to FIG. 4 or FIG. 2 when the first housing is slid. FIG. 3 is a sectional view of FIG. 5 along line III-III.

As shown in FIG. 1, a sliding type mobile phone 1 is provided with a first housing 2 and a second housing 3 that are vertically long. As shown by a white arrow, the first housing 2 and the second housing 3 are slidably coupled by a slide mechanism 4 in the vertical direction.

The first housing 2 has a vertically long display part 5, which is long in the vertical direction, on the surface thereof, and a receiver 6 is provided on the upper side of the display part 5. The display part 5 can be a liquid crystal display or an organic EL display.

The second housing 3 has an operation part 7 in a segment lower than the center of the surface. On this operation part 7 are provided, for example, function buttons 8 and numeric buttons 9. A receiver 10 is provided under the operation part 7.

As shown in a sectional view of FIG. 2, the first housing 2 and the second housing 3 are mutually electrically connected by a flexible substrate 11 (shown in dashed-two dotted lines) to be explained later.

As shown in FIG. 3 and FIG. 4, on the right and left ends of the surface of the second housing 2, a pair of rail parts 12 extending in the vertical direction are provided. The pair of rail parts 12 are formed in a groove shape concavely toward the outside from the right and left sides of the center of the second housing 3. On the other hand, on the back side cabinet 2a on the back side of the first housing 2, there is provided a vertically long locking part 13 in a manner of protruding horizontally to be inserted into the pair of rail parts 12. By inserting this locking part 13 into the rail parts 12, the first housing 2 is so designed to make sliding movement stably on the second housing 3. It should be noted that in FIG. 3, only the back side cabinet 2a is shown with respect to the first housing 2, while in FIG. 4 the first housing 2 is shown in the dashed-two dotted lines to facilitate viewing, with the operation part 7 and the like on the surface of the second housing 3 being omitted.

Between the pair of rail parts 12, a torsion coil spring 20 is provided. The torsion coil spring 20 aids the sliding of the first housing 2 to the upper end side of the second housing 3, while also aiding, after the sliding, the sliding of the first housing 2 back to the original position (below). The slide mechanism 4 is constituted of pair of the rail parts 12 and the torsion coil spring 20. In the vicinity of the side of the first housing 2 when viewed from the surface, that is, on the left side of the center in the vertical direction of the back side of the back side cabinet 2a, there is provided a first spring fixing pin 29 in a protruding manner to the second housing 3 side. Similarly, in the vicinity of the opposite side of the second housing 3 when viewed from the surface, that is, on the upper side and on the right side from the center in the vertical direction of the surface side, there is provided a second spring fixing pin 30 in a protruding manner to the first housing 2 side. The first annular part 26 is rotatably positioned relative to the first spring fixing pin 29. Similarly, the second annular part 27 is rotatably positioned relative to the second spring fixing pin 30.

Further, the torsion coil spring 20 is arranged such that the angle of torsion of the torsion coil spring 20 reaches the minimum at the mid-position (shown in FIG. 5 and FIG. 6) of the overall slide position of the first housing 2.

As shown in FIG. 4 and the like, the flexible substrate 11 is disposed under the torsion coil spring 20 at a preset distance from the torsion coil spring 20. It should be noted that in FIG. 4, the part of the flexible substrate 11 sandwiched between the torsion coil spring 20 is shown in a dashed-two dotted line. Specifically, as shown in FIG. 2, a display part side substrate 18 is provided on the back side of the display part 5 inside the first housing 2, while an operation part side substrate 19 is provided inside the second housing 3. The flexible substrate 11 has a vertically long rectangular shape, being arranged such that its length direction is along the vertical direction, its one end 11a being connected to the display part side substrate 18, and its other end 11b being connected to the operation part side substrate 19. The flexible substrate 11 has a proper degree of flexibility, its property being such that when folded, its bend part 11c curves to be in the U shape in side view. This enables the flexible substrate 11 to be coupled so that the bend part 11c forms the U shape in side view from the first housing 2 to the second housing 3.

—Operation—

Next, sliding operation of the sliding type mobile phone 1 according to the present embodiment will be described.

Figure 9:
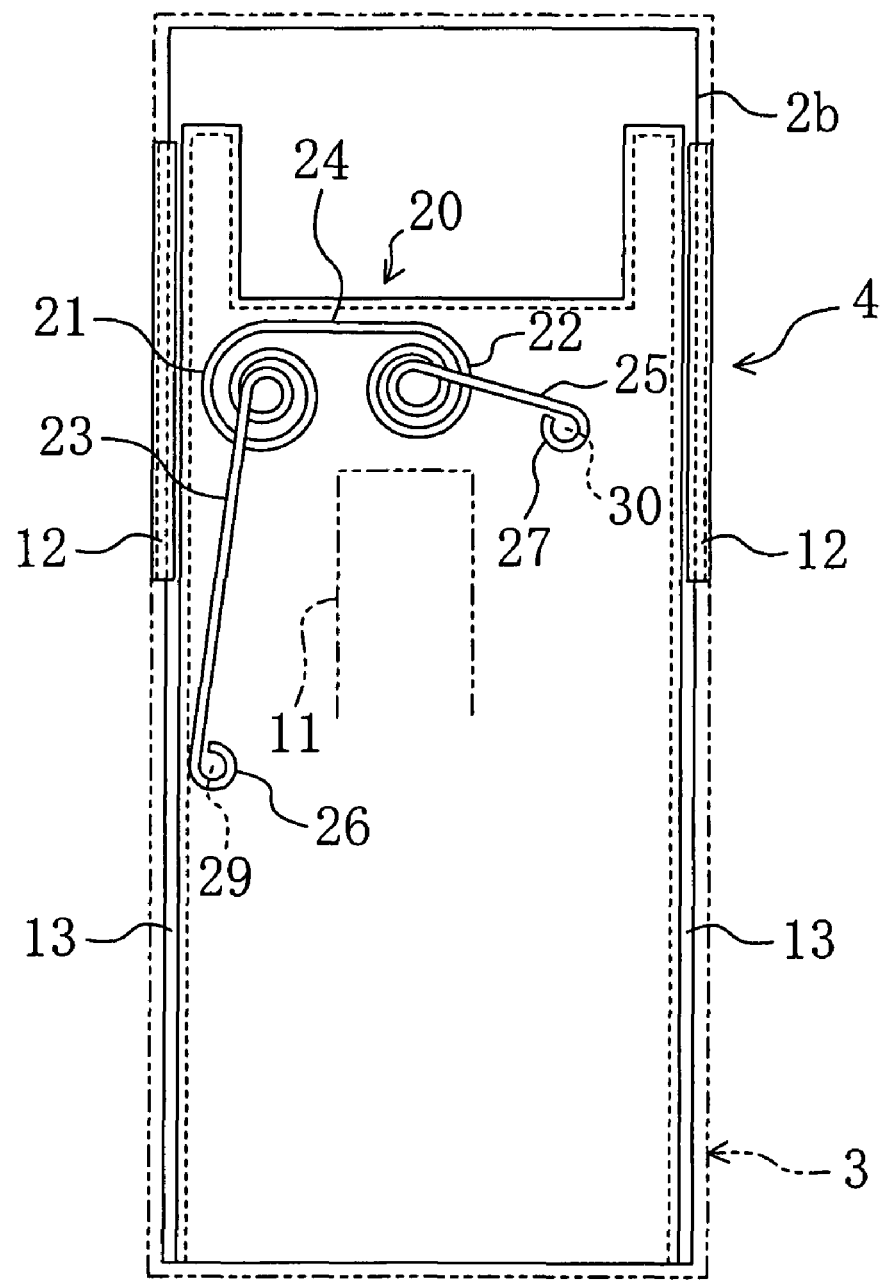
FIG. 9 is a diagram equivalent to FIG. 4 in which the first housing superposed on a second housing is shown.
Figure 10:
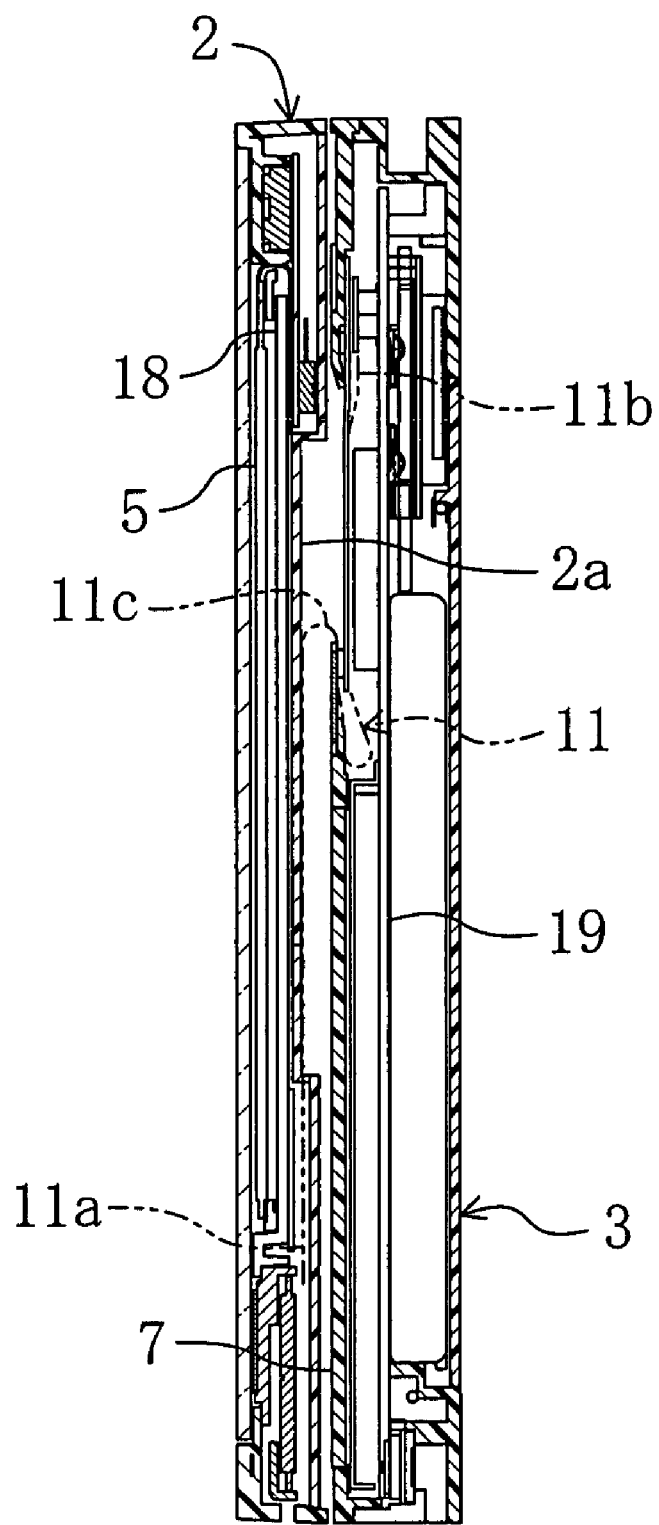
FIG. 10 is a diagram equivalent to FIG. 2 in which the first housing superposed on the second housing is shown.

First, as shown in FIG. 9 and FIG. 10, while in the standby state, the first housing 2 is in the state of being superposed on the second housing 3. The shape of the torsional coil panel spring 20 is such that in plan view, the two coil parts 21 and 22 are set side by side at approximately the same height. Under the second coil 22, the flexible substrate 11 is disposed at a distance from the torsion coil spring 20. The bend part 11c of the flexible substrate 11 maintains its U shape in side view.

Figure 7:
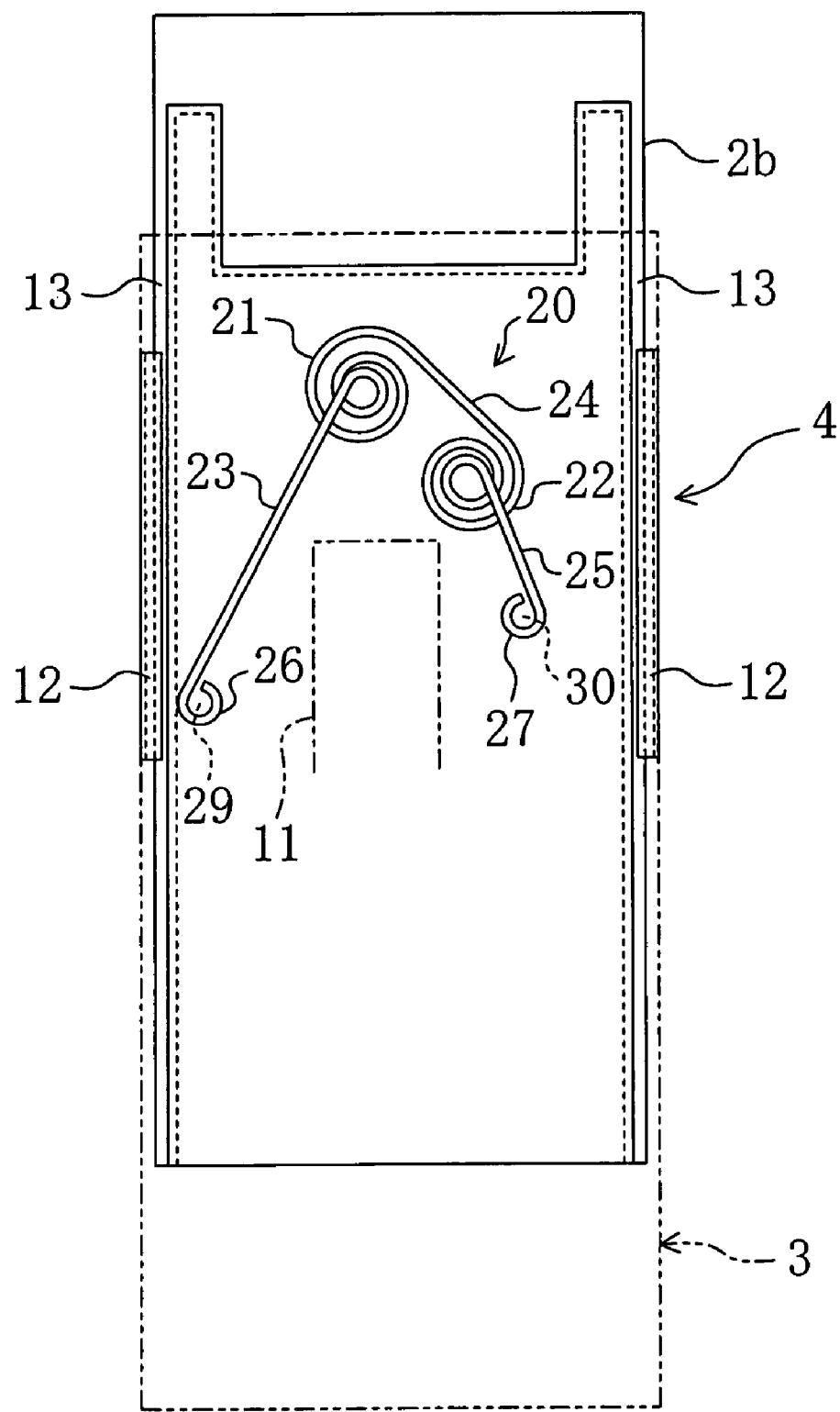
FIG. 7 is a diagram equivalent to FIG. 4 in which the first housing in the midst of sliding movement is shown.
Figure 8:
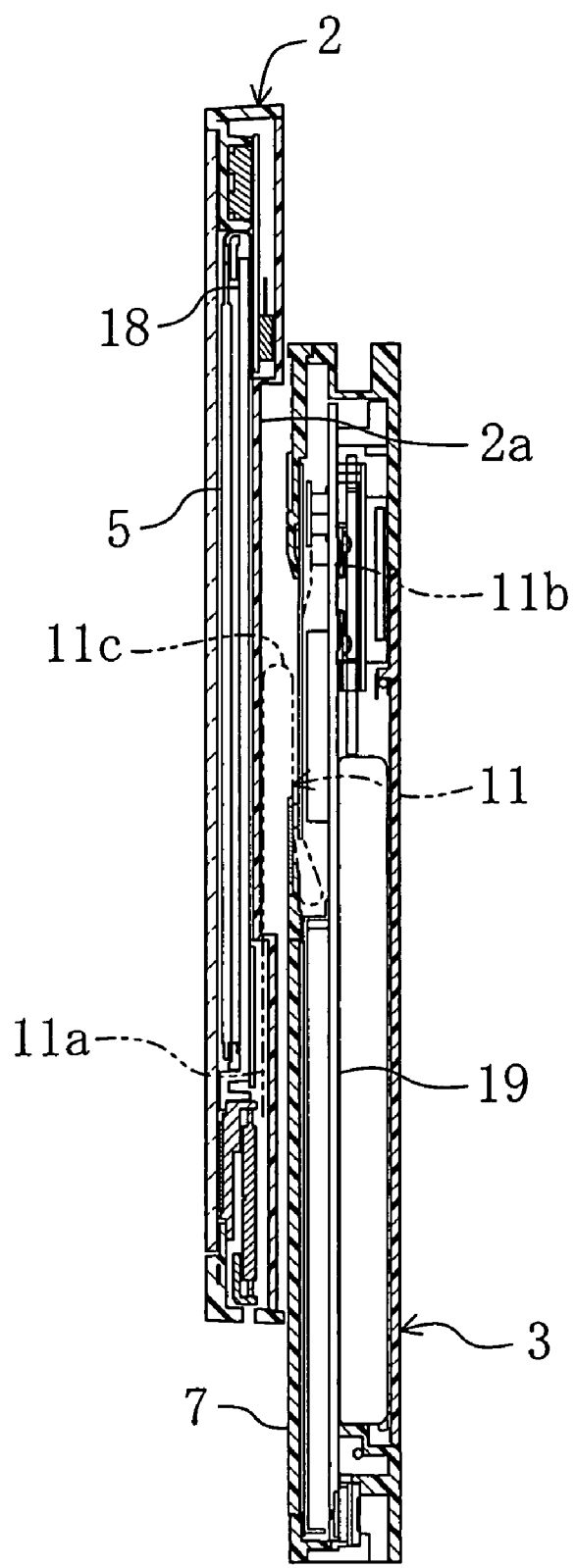
FIG. 8 is a diagram equivalent to FIG. 2 in which the first housing in the midst of sliding movement is shown.

Next, as shown in FIG. 7 and FIG. 8, the first housing 2 is slightly slid upward. At this time, the first housing 2 moves upward along the rail parts 12 provided on the second housing 3. The second annular part 27 is at a fixed position, rotating around the second fixing pin 30, while the first annular part 26 rotates around the first fixing pin 29 and moves upward at the same time. The shape of the torsion coil spring 20 is such that the first coil part 21 is positioned above the second coil part 22, thus forming in general a mountainous shape. Also, the flexible substrate 11, while the bend part 11c maintains the U shape, slides below the torsion coil spring 20 at a distance. The angle of torsion of the torsion coil spring 20 diminishes more than a free shape, which causes subjects the first housing 2 to make sliding movement against its biasing power.

Figure 5:
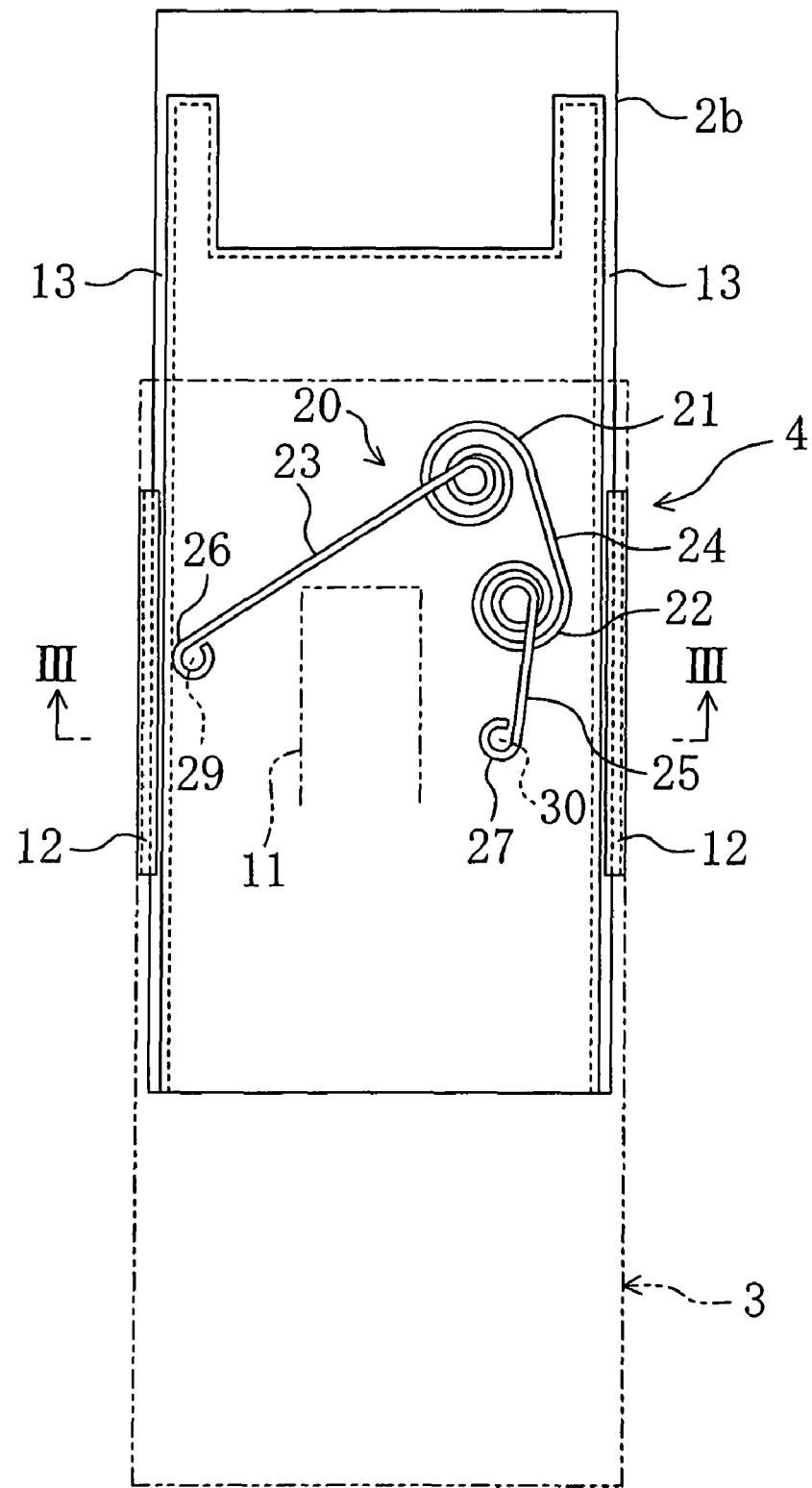
FIG. 5 is a diagram equivalent to FIG. 4 in which the first housing at a mid-position of sliding movement is shown.
Figure 6:
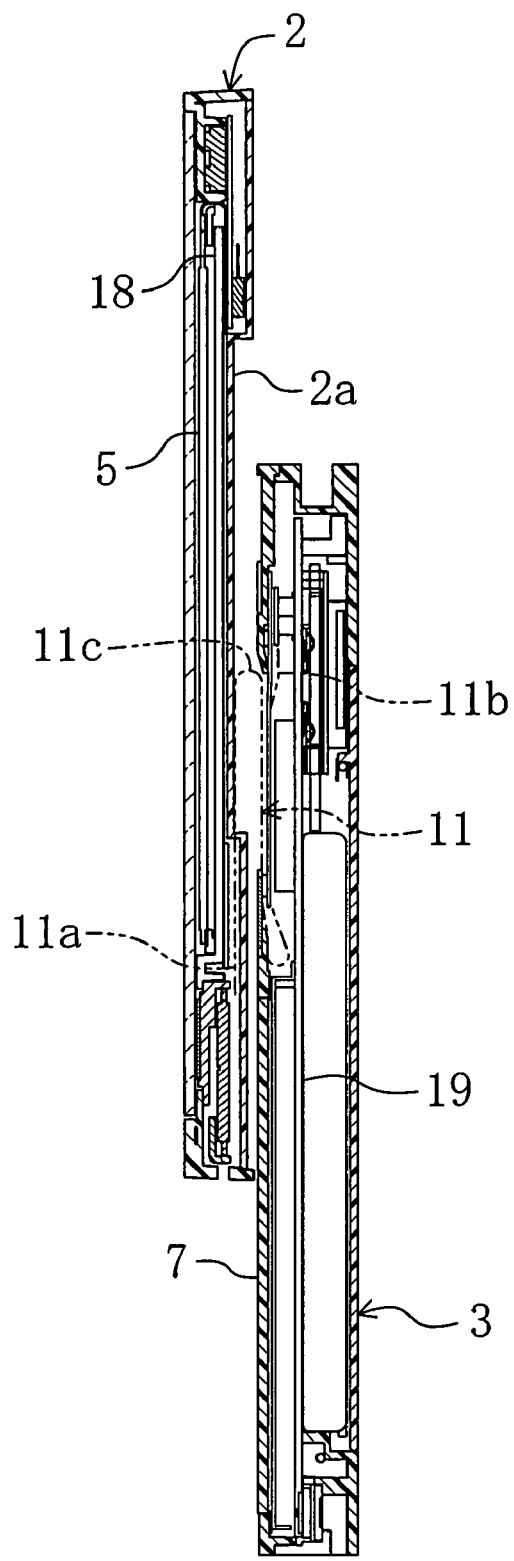
FIG. 6 is a diagram equivalent to FIG. 2 in which the first housing at the mid-position of the sliding movement is shown.

Next, as shown in FIG. 5 and FIG. 6, when the first housing 20 is further moved upward, the operation part gradually appears and reached the mid-position of the sliding movement of the first housing 2. The shape of the torsion coil spring 20 is such that the first coil part 21 further moves upward and to the right side. Also, the flexible substrate 11, while the bend part 11c maintains the U shape, slides inside the torsion coil spring 20 at a distance. At this time, the angle of torsion of the torsion coil spring 20 becomes the smallest, where elastic energy is stored in the largest amount. Thus, if the first housing 2 is displaced upward or downward off the mid-position, the compressed torsion coil spring 20 tries to return to the original position, so that the sliding movement of the first housing 20 is aided in either direction.

Next, when the first housing 2 is moved further upward, the torsion coil spring 20, in an attempt to return from the compressed state to the free shape, aids the sliding movement of the first housing 2. Then, as shown in FIG. 2 and FIG. 4, the first housing 2 moves to the upper end side of the second housing 3, and the operation part 7 fully appears to enable operation of the operation part 7 and communication. The shape of the torsion coil spring 20 is such that the first coil 21 moves above the second coil part 22, and the first and the second coil parts 21 and 22 are positioned on the right end. Also, the flexible substrate 11, while the bend part 11c maintains the U shape, slides inside the torsion coil spring 20 at a distance.

Conversely, when the first housing 2 is superposed on the second housing 3, an operation in reverse of the foregoing is employed.

In this manner, due to the biasing power of the torsion coil spring 20, when the first housing 2 is pushed by hand to slide a little and released, it tries to return to the pre-sliding state. However, if considerable sliding is executed by hand and the hand is released past the mid-position, the first housing 2 slides. That is, since the torsion coil spring 20 aids the sliding movement of the first housing 2 in either direction, a one-touch sliding operation can be performed smoothly.

Because the flexible substrate 11 is disposed at the preset distance from the torsion coil spring 20 and the first and the second coil parts 21 and 22 are made small in size, even when the first housing 2 is subjected to sliding movement, the flexible substrate 11 does not come into contact with the torsion coil spring 20.

By inserting the tips of the first and the third straight line parts 23 and 25 respectively into the first and second fixing pins 29 and 30, the torsion coil spring 20 rotates while avoiding the flexible substrate 11, and, therefore, even when subjecting the first housing 2 to sliding movement, there is no chance for the flexible substrate 11 to contact the torsion coil spring 20.

—Effects of the Embodiments—

Consequently, the torsion coil spring 20 according to the present embodiment is provided with the two coil parts 21 and 22, whose size is made small as compared to the case of one coil part so as to generate the same degree of angle of torsion. As a result, the torsion coil spring 20 can be arranged even in a small space.

Further, the two coil parts 21 and 22 are arranged in a region sandwiched between the first and the third straight line parts 23 and 25 to reduce the overall size of the torsion coil spring 20. Consequently, it is further facilitated to place the torsion coil spring 20 in a small space.

Further, the segments continuing from the two coil parts 21 and 22 respectively to the first and the third straight line parts 23 and 25 are made to protrude in the same direction to curtail the overall height. Therefore, the torsion coil spring 20 can be arranged in a thin space.

Further, on the tips of the first and the third straight line parts 23 and 25, the first and the second annular parts 26 and 27 are respectively formed, and the tips of the first and the third straight line parts 23 and 25 are inserted into pins, so that the torsion coil spring properly rotates. Consequently, when two objects are subjected to sliding movement, the torsion coil spring properly rotates around the first and the second annular parts 26 and 27, thereby making the sliding movement smooth.

Further, the first annular part 26 and the second annular part 27 are offset in side view to enable the first annular part 26 to be easily attached to the one object and the second annular part 27 to be easily attached to the other object. This facilitates the layout of the torsion coil spring 20.

Further, the torsion coil spring 20 is constituted of a stainless steel wire for spring to improve its corrosion resistance. As a result, a torsion coil spring 20 of high durability can be obtained.

Further, according to the sliding type mobile phone 1 of the present embodiment, the pair of rail parts 12 are provided on the surface of the second housing 3 and the torsion coil spring 20 having the two coil parts 21 and 22 aids the sliding movement of the first housing 2 on the rail parts 12, while at the same time the flexible substrate 11 electrically connecting the first housing 2 and the second housing 3 is disposed at a preset distance from the torsion coil spring 20. Thus, when the first housing 1 is subjected to sliding movement, the flexible substrate 11 does not contact the torsion coil spring 20 so that the flexible substrate 11 is prevented from impeding the sliding operation. This increases the degree of sliding and thus enlarges the display part 5 and the operation part 7. Consequently, a sliding type mobile phone 1 of good portability and operability as well as high merchandising quality can be obtained.

The flexible substrate 11 is arranged from the first housing 2 to the second housing 3 such that its bend part 11c is formed in the U shape in side view and that it smoothly changes its shape in keeping with the sliding movement of the first housing 2. Hence, the flexible substrate 11 is surely prevented from impeding the sliding operation and the degree of sliding is increased to maintain the operation part 7 large.

The angle of torsion of the torsion coil spring 20 reaches the minimum in the mid-position of the overall slide position of the first housing 2 so as to aid the sliding movement of the first housing 2 in either direction. Consequently, a one-touch sliding operation of the first housing 2 can be performed in either direction.

The first and the second annular parts 26 and 27 are formed respectively at the tips of the first and the third straight line parts 23 and 25, and the tips of the first and the third straight line parts 23 and 25 inserted respectively into pins, so that the torsion coil spring 20 rotates properly. Consequently, when the first housing 2 is subjected to sliding movement, the torsion coil spring 20 avoids the flexible substrate 11 so that the flexible substrate 11 is surely prevented from impeding the sliding operation.

The first annular part 26 is positioned rotatably in the vicinity of the side of the first housing 2, while the second annular part 27 is positioned rotatably in the vicinity of the opposite side of the second housing 3, thereby enabling the torsion coil spring, 20 to rotate between the pair of the rail parts 12. Consequently, the torsion coil spring 20 rotates while avoiding the flexible substrate 11, so that the flexible substrate 11 is surely prevented from impeding the sliding operation.

The segments continuing from the first and the second coil parts 21 and 22 respectively to the first and the third straight line part 23 and 25 protrude in the same direction to curtail the overall height. Consequently, the thickness of the sliding type mobile phone 1 is held down to secure its portability.

The first annular part 26 and the second annular part 27 are offset in side view to enable the first annular part 26 to be easily attached to the first housing 2 and the second annular part 27 to be easily attached to the second housing 3. This facilitates the layout of the torsion coil spring 20.

—Modified Example of the Embodiment—

Figure 16A:
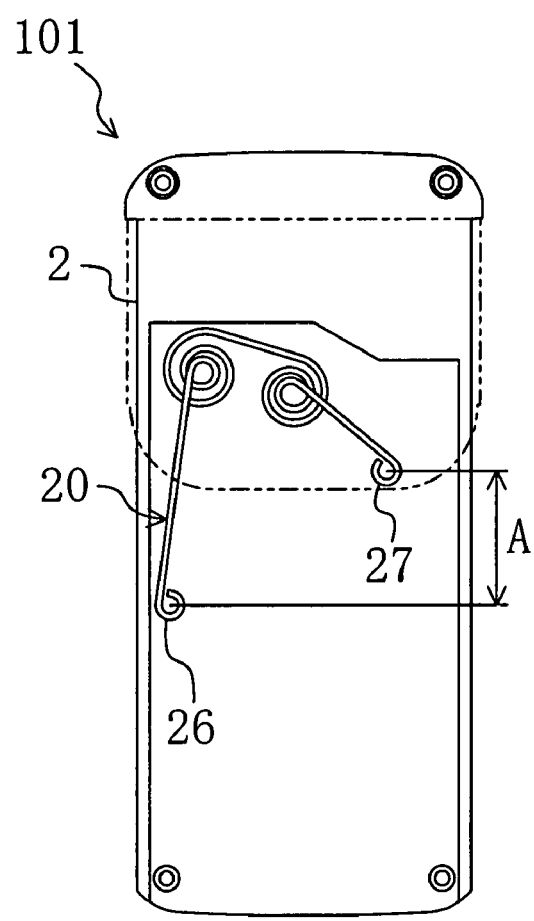
FIG. 16 is a diagram equivalent to FIG. 14 in which the first housing superposed on the second housing is shown.
Figure 16B:
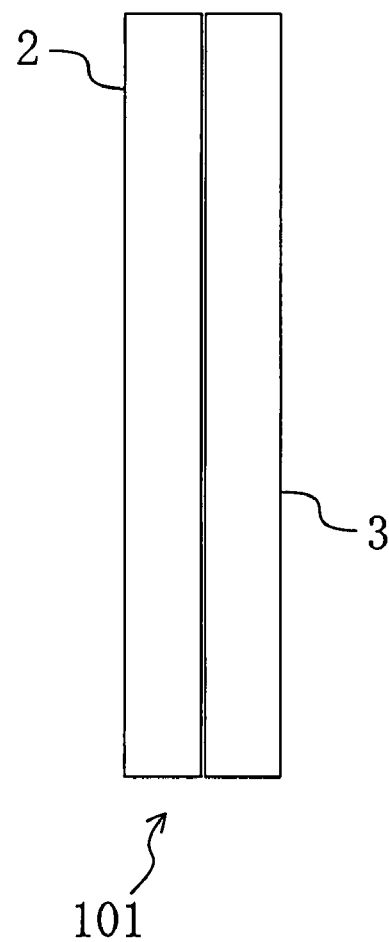

In FIGS. 14-16, a mobile phone 101 according to a modified example of the present embodiment is shown. A first degree of sliding A from the superposed state of the first housing 2 and the second housing 3 (shown in FIG. 14) to the mid-position (shown in FIG. 5) is less than a second degree of sliding B from the mid-position to the end-point of the sliding movement of the first housing 2 (A<B). An overall degree of sliding C is C=A+B. It should be noted in FIGS. 14-16, the mobile phone 101 is illustrated in a simplified manner to make it easy to see the torsional coil panel 20.

That is, if the first housing 2 is moved slightly more than the first degree of sliding A from the superposed state of the first housing 2 and the second housing 3, even without applying any force, the first housing 2 makes sliding movement to enable the operation part 7 to appear due to the biasing power of the torsion coil spring 20.

Similarly, if the first housing 2 is moved slightly more than the second degree of sliding from the end-point of the sliding movement of the first housing 2, where the operation part 7 has fully appeared, even without applying any force, the first housing 2 makes sliding movement to the superposed state of the first housing 2 and the second housing 3, due to the biasing power of the torsion coil spring 20. At this time, since the first degree of sliding A is less than the second degree of sliding B, the degree of sliding (A+C/2) when the first housing 2 is subjected to sliding movement to use the operation part 7 becomes less than the degree of sliding (B+C/2) when the first housing 2 is superposed on the second housing 3 to the standby state. Consequently, it is especially easy to subject the first housing 2 to sliding movement and to use the operation part 7.

Since it is extremely easy to subject the first housing 2 to sliding movement so as to use the operation part 7, a mobile phone 101 of even better operability can be obtained.

OTHER EMBODIMENTS

The present invention may employ the following configurations regarding the above embodiment.

That is, though not illustrated, a second operation part may be provided on the lower side of the surface of the first housing 2. This enables the second operation part to be operated while in the superposed state of the first housing 2 and the second housing 3. It is also made possible to operate the second operation part with the display part 5 in the horizontally long state. Still, since the degree of sliding of the first housing 2 can be increased in the present invention to widen the operating 7, it is not always necessary to provide a second operation part.

In the embodiment, the sliding type mobile phone 1 is provided with the vertically long first housing 2 and the vertically long second housing 3, but may be provided with a horizontally long first housing 2 and a horizontally long second housing 3. In this case, the display part is also horizontally long.

In the embodiment, the sliding type mobile equipment is set as the sliding type mobile phone 1, but it may as well be a PHS, a PD, a PC, a mobile tool, an electronic dictionary, a desktop calulator, a copying machine, and the like.

It should be mentioned that the embodiments are intrinsically preferred examples and not intended to limit the scope of the present invention, its applications and usage.

What is claimed is:

1. A torsion coil spring having stretching force in a torsional direction, comprising:
   a first coil part and a second coil part; and
   a first straight line part, a second straight line part, and a third straight line part, wherein:
   one end of the first coil part continues to one end of the first straight line part, while the other end continues to one end of the second straight line part;
   the other end of the second straight line part continues to one end of the second coil part; and
   the other end of the second coil part continues to one end of the third straight line part, and wherein
   the first coil part and the second coil part are wound in mutually opposite directions with gradually diminishing radiuses from ends of the second straight line part, and
   maximum radius segments and minimum radius segments of the first coil part and the second coil part are arranged on a same plane as the second straight line part, the minimum radius segment of the first coil part and the minimum radius segment of the second coil part protrude in the same direction away from the same plane and are continuous respectively to the first straight line part and the third straight line part.

2. The torsion coil spring according to claim 1, wherein a first annular part is formed at a tip of the first straight line part, and a second annular part is formed at a tip of the third straight line part.

3. The torsion coil spring according to claim 2, wherein:
   the third straight line part curves toward the same plane in side view;
   the second annular part is arranged on the plane; and
   the first annular part and the second annular part are offset in side view.

4. The torsion coil spring according to claim 1, wherein the torsion coil spring is constituted of a stainless steel wire for spring.

5. A sliding type mobile terminal provided with the torsion coil spring according to claim 1, comprising:

a first housing having a display part on a surface thereof;

a second housing having an operation part on the surface thereof;

a flexible substrate electrically connecting the first housing and the second housing; and a slide mechanism having: a pair of rails parts on the surface of the second housing, the pair of rails parts extending in a sliding direction of the first housing; and the torsion coil spring, the slide mechanism slidably coupling the first housing and the second housing to one another, wherein:

the torsion coil spring is provided between the pair of rail parts and performs at least one of aiding sliding of the first housing to cause the operation part to appear and aiding, after the sliding, sliding of the first housing back to an original position; and the flexible substrate is disposed in the vicinity of the torsion coil spring at a preset distance from the torsion coil spring.

6. The sliding type mobile terminal according to claim 5, wherein the flexible substrate is coupled between the first housing and the second housing so that a bend part forms a U shape in side view.

7. The sliding type mobile terminal according to claim 5, wherein an angle of torsion of the torsion coil spring reaches a minimum in a mid-position of an overall slide position of the first housing.

8. The sliding type mobile terminal according to claim 7, wherein a first degree of sliding from a position where the first housing is superposed on the second housing to the mid-position is smaller than a second degree of sliding from the mid-position to an end-point of the sliding movement of the first housing.

9. The sliding type mobile terminal according to claim 5, wherein a first annular part is formed at a tip of a first straight line part, and a second annular part is formed at a tip of a third straight line part.

10. The sliding type mobile terminal according to claim 9, wherein the first annular part of the first straight line part is positioned rotatably in the vicinity of a side of the first housing, while the second annular part of the third straight line part is positioned rotatably in the vicinity of an opposite side of the second housing.

11. The sliding type mobile terminal according to claim 10, wherein:

the third straight line part curves toward the same plane in side view;

the second annular part is arranged on the plane; and the first annular part and the second annular part are offset in side view.

12. The sliding type mobile terminal according to claim 5, wherein the sliding type mobile terminal is a sliding type mobile phone.

\* \* \* \* \*